(12) United States Patent
Coscarella

(10) Patent No.: US 7,325,573 B2
(45) Date of Patent: Feb. 5, 2008

(54) PLUMBING LINE TEST PLUG AND METHOD OF USE OF THE SAME

(76) Inventor: Gabe Coscarella, 15703 - 64 Street NW, Edmonton, AB (CA) T5Y 2N5

( * ) Notice: Subject to any disclaimer, the term of this patent is extended or adjusted under 35 U.S.C. 154(b) by 0 days.

(21) Appl. No.: 11/408,915

(22) Filed: Apr. 21, 2006

(65) Prior Publication Data

US 2006/0237082 A1    Oct. 26, 2006

(30) Foreign Application Priority Data

Apr. 25, 2005    (CA)   ................................ 2504887

(51) Int. Cl.
*F16L 55/10* (2006.01)

(52) U.S. Cl. .................... 138/89; 138/90; 73/49.1; 73/49.5

(58) Field of Classification Search ............... 138/89, 138/90; 73/49.1, 49.5
See application file for complete search history.

(56) References Cited

U.S. PATENT DOCUMENTS

| | | | | |
|---|---|---|---|---|
| 2,306,444 A * | 12/1942 | Hubbard | ............... | 4/255.04 |
| 2,327,615 A | 8/1943 | Ankarlo | ............... | 138/93 |
| 2,373,242 A | 4/1945 | Glashow | ............... | 138/89 |
| 3,019,819 A | 2/1962 | Ankarlo | ............... | 138/93 |
| 3,154,106 A | 10/1964 | Nooy | ............... | 138/94 |
| 3,442,295 A | 5/1969 | Nooy | ............... | 138/94 |
| 3,903,728 A * | 9/1975 | Matthews, Jr. | ............... | 73/40.5 R |
| 4,040,450 A | 8/1977 | Boundy | ............... | 138/94 |
| 4,429,568 A | 2/1984 | Sullivan | ............... | 138/90 X |
| 4,763,510 A * | 8/1988 | Palmer | ............... | 73/40.5 R |
| 4,777,008 A * | 10/1988 | Shirasu | ............... | 376/204 |
| 5,033,510 A | 7/1991 | Huber | ............... | 138/90 |
| 5,163,480 A | 11/1992 | Huber | ............... | 138/94 |
| 5,297,581 A | 3/1994 | Godfrey | ............... | 138/94 |
| 5,507,501 A * | 4/1996 | Palmer | ............... | 277/602 |
| 5,740,830 A | 4/1998 | Mankins | ............... | 137/15.07 |
| 6,062,262 A | 5/2000 | Tash | ............... | 138/89 |
| 6,289,935 B1 | 9/2001 | Tash | ............... | 138/97 |
| 6,564,823 B1 | 5/2003 | Mankins | ............... | 137/318 |

FOREIGN PATENT DOCUMENTS

FR    2502210 A *   9/1982

OTHER PUBLICATIONS

Cherne Industries, Clean Seal Plugs, available at http://www.cherneind.com/products-display.asp?pind=pp_3, at least as early as Mar. 2004.

Cherne Industries, Single-Size Test-Ball Plugs, available at http://www.cherneind.com/products-display.asp?pind=pp_1, at least as early as Mar. 2004.

(Continued)

*Primary Examiner*—Patrick F. Brinson
(74) *Attorney, Agent, or Firm*—Christensen O'Connor Johnson Kindness PLLC

(57) ABSTRACT

A plumbing line test plug includes a plug body adapted to plug an interior diameter of a plumbing line. The body has a wet face, which is exposed to liquid when in use, and a dry face, which is opposed to the wet face. A flexible pressure responsive annular membrane extends outwardly and rearwardly from the wet face. Hydraulic pressure of liquid in the plumbing line, forces the flexible pressure responsive annular membrane into sealing engagement with interior walls of the plumbing line.

5 Claims, 1 Drawing Sheet

OTHER PUBLICATIONS

Cherne Industries, Long Test Ball and MS2 Plugs, available at http://www.cherneind.com/products-display.asp?pind=pp_5, at least as early as Mar. 2004.

Cherne Industries, T-Handle Gripper Plugs, available at http://www.cherneind.com/products-display.asp?pind=mp_2_a, at least as early as Mar. 2004.

* cited by examiner

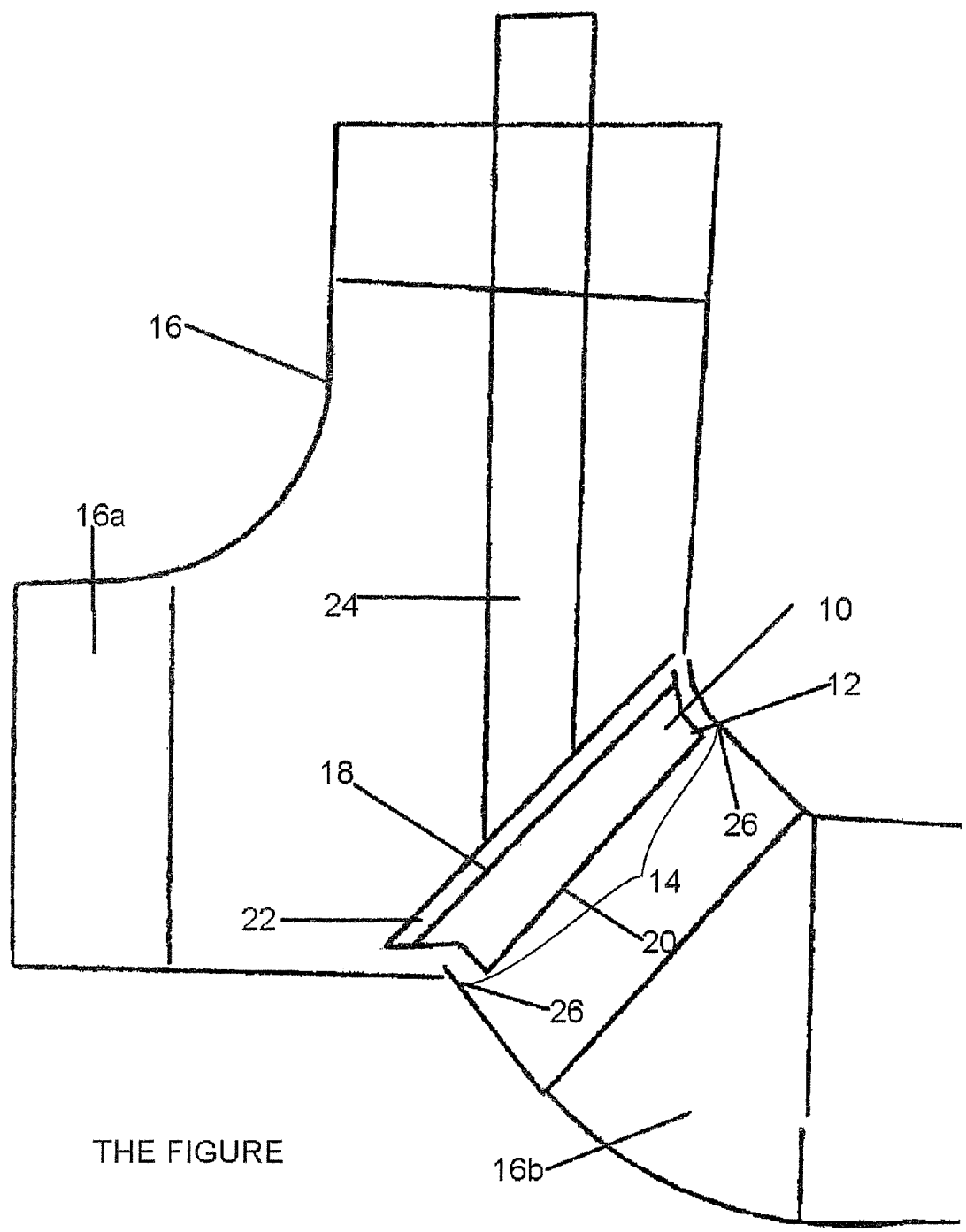
THE FIGURE

PLUMBING LINE TEST PLUG AND METHOD OF USE OF THE SAME

FIELD OF THE INVENTION

The present invention relates to a plug, which is used when testing plumbing lines for leaks.

BACKGROUND OF THE INVENTION

After plumbing lines are installed or repaired, the plumbing lines must be tested to ensure they can withstand liquid pressures. Plumbing line test plugs currently in use have a plug with an annular seal. The test plugs have a liquid engaging or "wet" face and a dry face. Levers attached to the dry face are used position the test plug in a plumbing line and provide a resisting force against the liquid acting against the wet face. Examples of such plumbing line test plugs are found in U.S. Pat. No. 4,040,450 (Boundy 1977), U.S. Pat. No. 6,062,262 (Tash 2000) and U.S. Pat. No. 6,289,935 (Tash 2001).

SUMMARY OF THE INVENTION

The present invention relates to a plumbing line test plug, which operates upon different principles.

According to one aspect of the present invention there is provided a plumbing line test plug, which includes a plug body adapted to plug an interior diameter of a plumbing line. The body has a wet face, which is exposed to liquid when in use, and a dry face which is opposed to the wet face. A flexible pressure responsive annular membrane extends outwardly and rearwardly from the wet face. Hydraulic pressure of liquid in the plumbing line, forces the flexible pressure responsive annular membrane into sealing engagement with interior walls of the plumbing line.

According to another aspect of the present invention there is provided a method of using a plumbing line test plug. A first step involves providing a plumbing line test plug, as described above. A second step involves inserting the plug body into a plumbing line and exposing the wet face to liquid, so that hydraulic pressure of the liquid in the plumbing line forces the flexible pressure responsive annular membrane into sealing engagement with interior walls of the plumbing line.

With the plumbing line test plug, as described above, no resisting force is required. Instead of hydraulic force of liquid in the plumbing line exerting a dislodging force, the hydraulic force holds the plumbing line test plug in position. This eliminates the need for a lever to apply a resisting force. With some installations, it is useful to have a handle attached to the wet face, which can be used to assist in placement of the plug body when inserting the plug body into the plumbing line. The handle is, typically, left in the plumbing line and becomes submerged in liquid during the testing process. Of course, with shallow installations a handle is not necessary, as the plumbing line test plug can be positioned by hand.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein:

The FIGURE is a side elevation view, in section, of a plumbing line into which a plumbing line test plug constructed in accordance with the teachings of the present invention has been inserted.

DETAILED DESCRIPTION OF THE PREFERRED EMBODIMENT

The preferred embodiment, a plumbing line test plug generally identified by reference numeral 10, will now be described with reference to the FIGURE.

Structure and Relationship of Parts:

Plumbing line test plug 10 includes a plug body 12. As can be seen from a review of the FIGURE, plug body is adapted to plug an interior diameter 14 of a plumbing line 16. Plug body has a wet face 18, which is exposed to liquid when in use, and a dry face 20, which is opposed to wet face 18. A flexible pressure responsive annular membrane 22 extends outwardly and rearwardly from wet face 18.

Although not essential, it is preferred that a handle 24 be attached to wet face. Handle 24 may be used to assist in placement of plug body 12 within plumbing line 16, as will hereinafter be described.

Operation:

When using plumbing line test plug 10, plug body 12 is inserted into plumbing line 16, in a desired position. This isolates an upstream section 16a of plumbing line 16, which needs to be tested for leaks, from a downstream section 16b of plumbing line 16. Water is then allowed to fill upstream section 16a, exposing wet face 18 of plug body 12 to liquid. The hydraulic pressure of the liquid in plumbing line 16 forces flexible pressure responsive annular membrane into sealing engagement with interior walls 26 of plumbing line 16.

In many installations, the plumbing line test plug 10 may be installed manually, rendering the need for a handle unnecessary. However, where the installation location is beyond manual reach, a handle 24 may be used to assist in placement of the plug body 12 into the plumbing line 16, for example by inserting the handle 24 though a vertical conduit, or riser, as shown in the FIGURE. When a handle 24 is used, the handle is generally left in the plumbing line 16 where it becomes submerged in liquid during the testing procedure.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A plumbing line test plug, comprising:
    a plug body adapted to plug an interior diameter of a plumbing line, the body having a wet face which is exposed to liquid when in use and a dry face which is opposed to the wet face;
    a flexible pressure responsive annular membrane extending outwardly and rearwardly from the wet face, such that hydraulic pressure of liquid in the plumbing line forces the flexible pressure responsive annular membrane into sealing engagement with interior walls of the plumbing line, wherein the flexible pressure responsive annular membrane is maintained in sealing engagement with the interior walls solely by said hydraulic pressure and wherein the plug body is held in a substantially stable position within the plumbing line solely by the flexible pressure responsive annular membrane under said hydraulic pressure.

2. The plumbing line test plug as defined in claim 1, wherein a handle is attached to the wet face, the handle being adapted to assist in placement of the plug body within the plumbing line.

3. A method of using a plumbing line test plug, comprising the steps of:
  providing a plug body which is adapted to plug an interior diameter of a plumbing line, the body having a wet face which is exposed to liquid when in use and a dry face which is opposed to the wet face, the plug body having a flexible pressure responsive annular membrane extending outwardly and rearwardly from the wet face; and
  inserting the plug body into a plumbing line in a position to isolate an upstream section from a downstream section and exposing the wet face to liquid and having hydraulic pressure of the liquid in the plumbing line force the flexible pressure responsive annular membrane into sealing engagement with interior walls of the plumbing line, wherein the flexible pressure responsive annular membrane is maintained in sealing engagement with the interior walls solely by said hydraulic pressure and wherein the plug body is held in a substantially stable position within the plumbing line solely by the flexible pressure responsive annular membrane under said hydraulic pressure.

4. The method as defined in claim 3, the plug body having a handle attached to the wet face, the handle being used to assist in placement of the plug body beyond manual reach when inserting the plug body into the plumbing line.

5. The method as defined in claim 3, wherein the plug body is inserted through a riser into the plumbing line.

\* \* \* \* \*